(12) United States Patent
Feng et al.

(10) Patent No.: US 8,446,909 B2
(45) Date of Patent: May 21, 2013

(54) EXTENSION OF AUDIO/VIDEO BRIDGING RESERVATION PROTOCOL

(75) Inventors: Fei Fei Feng, Yongin-si (KR); Cornelis Johannis Den Hollander, Yongin-si (KR); Hyun Surk Ryu, Yongin-si (KR); Hong Kyu Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1059 days.

(21) Appl. No.: 11/822,799

(22) Filed: Jul. 10, 2007

(65) Prior Publication Data

US 2008/0112433 A1    May 15, 2008

(30) Foreign Application Priority Data

Nov. 13, 2006    (KR) .................. 10-2006-0111713

(51) Int. Cl.
*H04L 12/46*    (2006.01)
(52) U.S. Cl.
USPC ........................................ 370/395.3; 370/401
(58) Field of Classification Search
USPC ................. 370/229, 230, 231, 235, 236, 255, 370/256, 351, 389, 390, 392, 396, 395, 21, 370/395.3, 395.41, 395.42, 400, 401
See application file for complete search history.

(56) References Cited

U.S. PATENT DOCUMENTS

2003/0165140 A1*  9/2003  Tang et al. .................. 370/393
2007/0263554 A1*  11/2007  Finn .............................. 370/256
2007/0263640 A1*  11/2007  Finn .............................. 370/401

OTHER PUBLICATIONS

Feng, Felix Feifei, GARP-Based Smple Reservation Protocol, Jul. 2005, Samsung Electronics, All Pages.*
Felix Feng, IEEE 802.1: 802.1 Qat—Stream Reservation Protocol, Nov. 11, 2006, presented Jul. 14, 2006.

* cited by examiner

*Primary Examiner* — Michael Thier
*Assistant Examiner* — Curtis A Alia
(74) *Attorney, Agent, or Firm* — NSIP Law

(57) ABSTRACT

An audio/vide bridging (AVB) system using an extended AVB reservation protocol, and a resource reservation method are provided where an AVB system using an extended AVB reservation protocol includes an egress device for transmitting a Generic Attribute Registration Protocol (GARP) or Multiple Registration Protocol (MRP) message comprising an AVB stream identifier or an application stream identifier to a relay device, the relay device for registering the AVB stream identifier or the application stream identifier according to the GARP/MRP message, and transmitting the GARP/MRP message comprising the application stream identifier, to an ingress device, and the ingress device for allocating the AVB stream identifier corresponding to the application stream identifier via the GARP/MRP message comprising the application stream identifier, and transmitting a reservation signal to the relay device.

16 Claims, 6 Drawing Sheets

EXTENSION OF AUDIO/VIDEO BRIDGING RESERVATION PROTOCOL

CROSS-REFERENCE TO RELATED APPLICATIONS

This application claims the benefit under 35 U.S.C. §119(a) of a Korean Patent Application No. 10-2006-0111713, filed on Nov. 13, 2006, in the Korean Intellectual Property Office, the entire disclosure of which is hereby incorporated by reference.

BACKGROUND OF THE INVENTION

1. Field of the Invention

The present invention relates to an audio/video bridging (AVB) system using an extended AVB reservation protocol and a method of reserving a resource. More particularly, the present invention relates to an AVB system which can perform a registration process or a reservation process without an additional request or an extension of an upper layer application by using an application stream identifier corresponding to the upper layer application, and a method of reserving a resource.

2. Description of Related Art

An audio/video bridging (AVB) technology generally indicates a technology which provides streaming services with a comparatively smaller delay in an Institute of Electrical and Electronics Engineers (IEEE) 802 network using a time-synchronization. The AVB technology may utilize a stream reservation protocol which secures a resource in a bridge for an audio/video stream.

Currently, an AVB reservation protocol includes an egress device to start a registration process based on a Generic Attribute Registration Protocol (GARP) or Multiple Registration Protocol (MRP) of an IEEE 802.1 standard and an ingress device to start an admission control process.

The egress device utilizes a GARP/MRP registration/deregistration to ensure its intention of joining a stream transmission. With this operation, the ingress device and a relay device will know where potential egress devices are and how to acquire information about the egress devices.

Also, the ingress device transmits a reservation signal to the egress device and performs admission control and resource reservation for the above-described stream transmission.

An AVB reservation protocol is generally triggered and used by an upper layer application, such as an RSVP, a Universal Plug and Play Audio/Video (UPnP AV), a Universal Plug and Play Quality of Service (UPnP QoS), and the like. Therefore, an interface method between the AVB reservation protocol and the upper layer application is required.

FIG. 1 is a diagram illustrating an AVB system using an AVB reservation protocol according to a conventional art.

As described above, the AVB reservation protocol corresponds to a layer 2 (L2) reservation protocol which is triggered by an upper layer application 101. The AVB reservation protocol may configure a filtering database 103 that has an L2 stream identifier 102.

The AVB reservation protocol currently requires both an egress device 104 and an ingress device 105 to be aware of an AVB stream identifier corresponding to an L2 reservation protocol. The AVB stream identifier may be in a format compatible with a current bridge forwarding mechanism to enable efficient data forwarding. A current proposal is to use a 48-bit MAC address.

AVB stream identifiers are generally allocated by the ingress device 105 and known to the egress device 104. However, the AVB reservation protocol is not involved in conveying the AVB stream identifier between the egress device 104 and the ingress device 105 and the conveying is performed by the upper layer application 101 that triggers the AVB reservation protocol.

As described above, in the conventional art, a conveyance between an ingress device and an egress device with respect to information regarding the AVB stream identifier is performed by a standardized upper layer application and thus a protocol of performing the conveyance may not be readily extended. For example, while RSVP can be used to reserve resources in an Internet Protocol (IP) layer, RSVP should trigger an AVB reservation protocol to reserve a resource corresponding to a layer associated with the AVB reservation protocol. However, the RSVP does not have a capability to convey information regarding the AVB stream identifier between the egress device and the ingress device. Specifically, as described above, the RSVP may not transmit the AVB stream identifier allocated by the ingress device to the egress device.

To overcome the above-described disadvantages, an AVB stream identifier of an ingress device may be transmitted to an egress device by adding a new signal to an AVB reservation protocol, which may incur an additional signaling overhead and stream setup latency.

Accordingly, there is a need for an AVB system using an extended AVB reservation protocol and a reservation method.

SUMMARY OF THE INVENTION

Exemplary embodiments of the present invention address at least the above problems and/or disadvantages and provide at least the advantages described below. Accordingly, an aspect of exemplary embodiments of the present invention is to provide an AVB system using an extended AVB reservation protocol and a resource reservation method.

Another aspect of exemplary embodiments of the present invention is to provide an AVB system using an extended AVB reservation protocol and a resource reservation method, which can perform a process for registration and reservation of a resource by using an application stream identifier of an upper layer application even when an egress device is unaware of an AVB stream identifier.

Another aspect of exemplary embodiments of the present invention is to provide an AVB system using an extended AVB reservation protocol and a resource reservation method, which can perform the process for registration and reservation of the resource with a single go-and-return operation even when the egress device is unaware of the AVB stream identifier.

Another aspect of exemplary embodiments of the present invention is to provide an AVB system using an extended AVB reservation protocol and a resource reservation method, which can reduce a signaling overhead and stream setup latency via an AVB reservation protocol by using a standard service interface without an additional requirement or extension with respect to the upper layer application and thereby can enhance a system performance.

Another aspect of exemplary embodiments of the present invention is to provide an AVB system using an extended AVB reservation protocol that includes an egress device for transmitting a Generic Attribute Registration Protocol (GARP) or Multiple Registration Protocol (MRP) message, comprising an AVB stream identifier or an application stream identifier, to a relay device, the relay device for registering the AVB stream identifier or the application stream identifier according to the GARP/MRP message, and transmitting the GARP/MRP message comprising the application stream identifier, to an ingress device, and the ingress device for allocating the AVB stream identifier corresponding to the application stream identifier via the GARP/MRP message comprising the application stream identifier and transmitting a reservation signal to the relay device.

In an exemplary implementation, the relay device may extract the AVB stream identifier or the application stream identifier from the GARP/MRP message and register the extracted AVB stream identifier or the application stream identifier and transmit the GARP/MRP message to the ingress device when the GARP/MRP message comprises the application stream identifier.

In an exemplary implementation, the reservation signal may include the application stream identifier and the AVB stream identifier corresponding to the application stream identifier.

In an exemplary implementation, the relay device may map the AVB stream identifier and the application stream identifier based on the reservation signal received from the ingress device and transmit the reservation signal to the egress device.

Another aspect of exemplary embodiments of the present invention is to provide a method of reserving a resource using an extended AVB reservation protocol includes transmitting, by an egress device, a GARP/MRP message comprising an application stream identifier to a relay device when the egress device excludes an AVB stream identifier, registering, by the relay device, the application stream identifier comprised in the GARP/MRP message, and transmitting the GARP/MRP message to an ingress device, allocating, by the ingress device, the AVB stream identifier corresponding to the application stream identifier and thereby generating a reservation signal and transmitting the generated reservation signal to the relay device, and mapping, by the relay device, the application stream identifier and the AVB stream identifier by using the reservation signal, and transmitting the reservation signal to the egress device.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary features and advantages of certain exemplary embodiments of the present invention will become more apparent from the following detailed description of certain exemplary embodiments thereof when taken in conjunction with the accompanying drawings in which.

Throughout the drawings, like reference numerals will be understood to refer to like elements, features, and structures.

DETAILED DESCRIPTION OF EXEMPLARY EMBODIMENTS

The matters exemplified in the description are provided to assist in a comprehensive understanding of the exemplary embodiments of the invention. Accordingly, those of ordinary skill in the art will recognize that various changes and modifications of the embodiments described herein can be made without departing from the scope and spirit of the claimed invention. Also, descriptions of well-known functions and constructions are omitted for clarity and conciseness.

According to exemplary embodiments of the present invention, an interface between a current audio/video bridging (AVB) reservation protocol and an upper layer application is enabled without an additional correction by extending the current AVB reservation protocol.

In an exemplary implementation, when the upper layer application triggers an egress device or an ingress device, the upper layer application may provide an application stream identifier to. The entity of the AVB reservation protocol For example, a "session object" in a Resource Reservation protocol (RSVP), a "connection identifier" in a Universal Plug and Play Audio/Video (UPnP AV), a "traffic identifier" in a Universal Plug and Play Quality of Service (UPnP QoS), and the like, may be provided.

Identifiers as described above have a different format from an AVB stream identifier of the AVB reservation protocol and may not be applicable to forward data of a layer using the AVB reservation protocol. In an exemplary implementation, a one-to-one mapping relation between the AVB stream identifier and the application stream identifier may be required.

Figure 2:
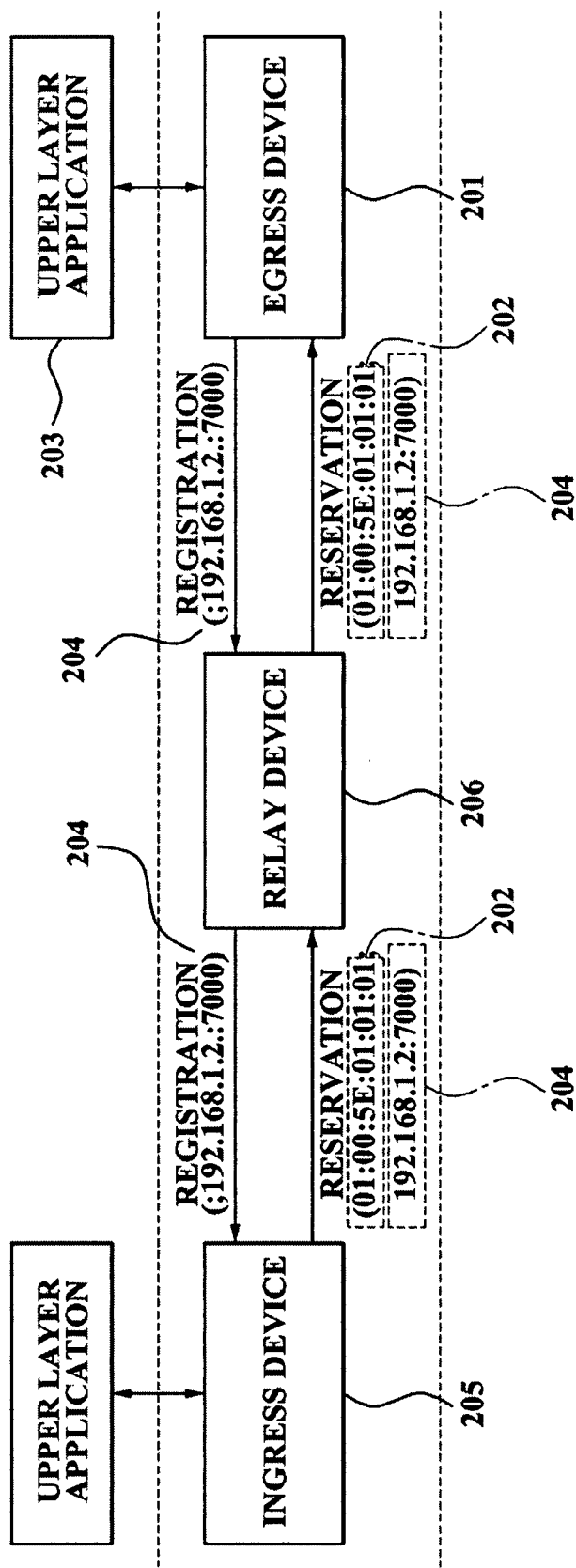
FIG. 2 is a diagram illustrating an AVB system using an extended AVB reservation protocol according to an exemplary embodiment of the present invention.

FIG. 2 is a diagram illustrating an AVB system using an extended AVB reservation protocol according to an exemplary embodiment of the present invention.

Figure 1:
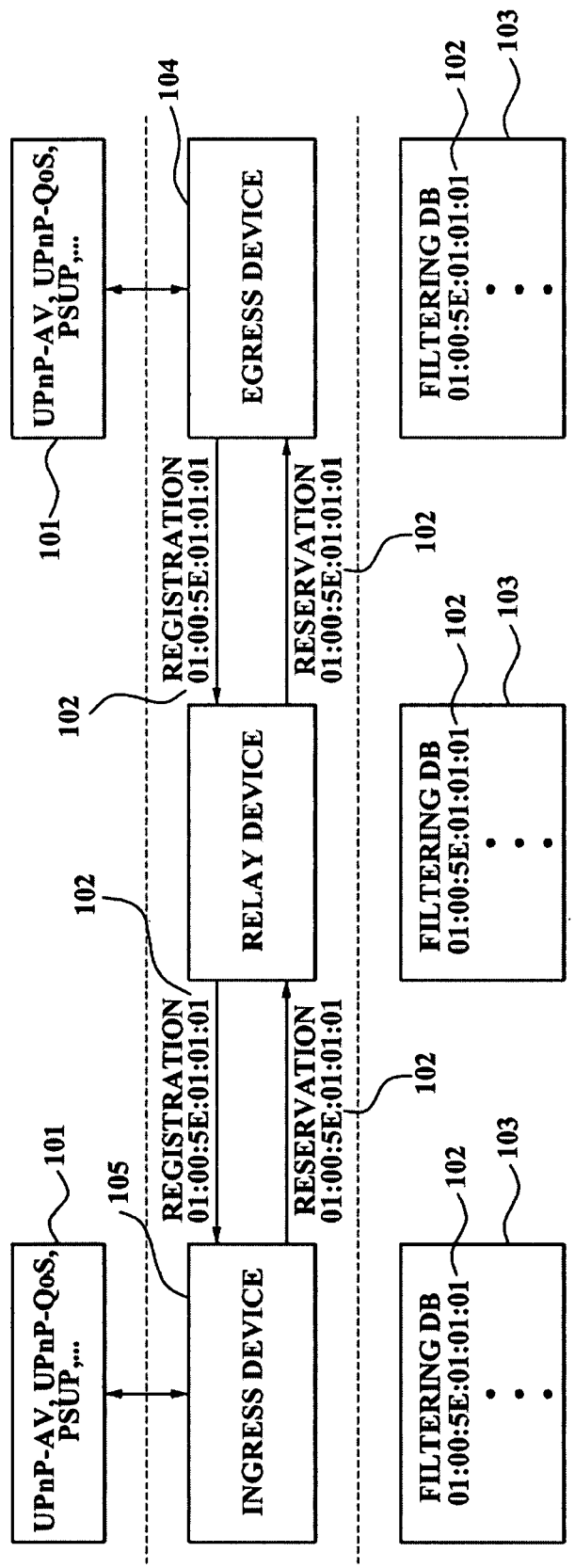
FIG. 1 is a diagram illustrating an AVB system using an AVB reservation protocol according to conventional art.

When an egress device 201 is aware of an AVB stream identifier 202, the egress device 201 may perform a resource registration process and a resource reservation process as described with FIG. 1. However, when the egress device 201 is unaware of the AVB stream identifier 202, an application stream identifier 204 may be provided to the egress device 201 when the upper layer application 203 triggers the AVB reservation protocol.

Also, the egress device 201 may generate a Generic Attribute Registration Protocol (GARP) or Multiple Registration Protocol message including the application stream identifier, and transmit the generated GARP/MRP message to an ingress device 205. In an exemplary implementation, a relay device 206 registers the application stream identifier 204 which is included in the initially received GARP/MRP message and transmits the GARP/MRP message to the ingress device 205.

The ingress device 205 receives the GARP/MRP message, allocates the corresponding AVB stream identifier 202 via the application stream identifier 204 included in the GARP/MRP message, generates a reservation signal including the AVB stream identifier 202 and the application stream identifier 204 and transmits the generated reservation signal to the egress device 201.

The relay device 206 receives the reservation signal, maps the AVB stream identifier 202 with respect to the registered application stream identifier 204, and transmits the reservation signal to the egress device 201.

The egress device 201 may become aware that the registration and reservation of the resource is completed by receiving the reservation signal. Specifically, a process for registration and reservation of the resource may be performed with a single go-and-return operation. Also, since the AVB stream identifier 202 is received, the egress device 201 may perform the refresh process for registration of the corresponding stream by using only the AVB stream identifier 202.

Also, the relay device 206 may include mapped information of the AVB stream identifier 202 and the application stream identifier 204. Therefore, with respect to an identical upper layer application transmitted from another egress device, the relay device 206 may immediately provide the AVB stream identifier 202 to the different egress device by using the mapped information. Also, overhead may be reduced.

Figure 3:
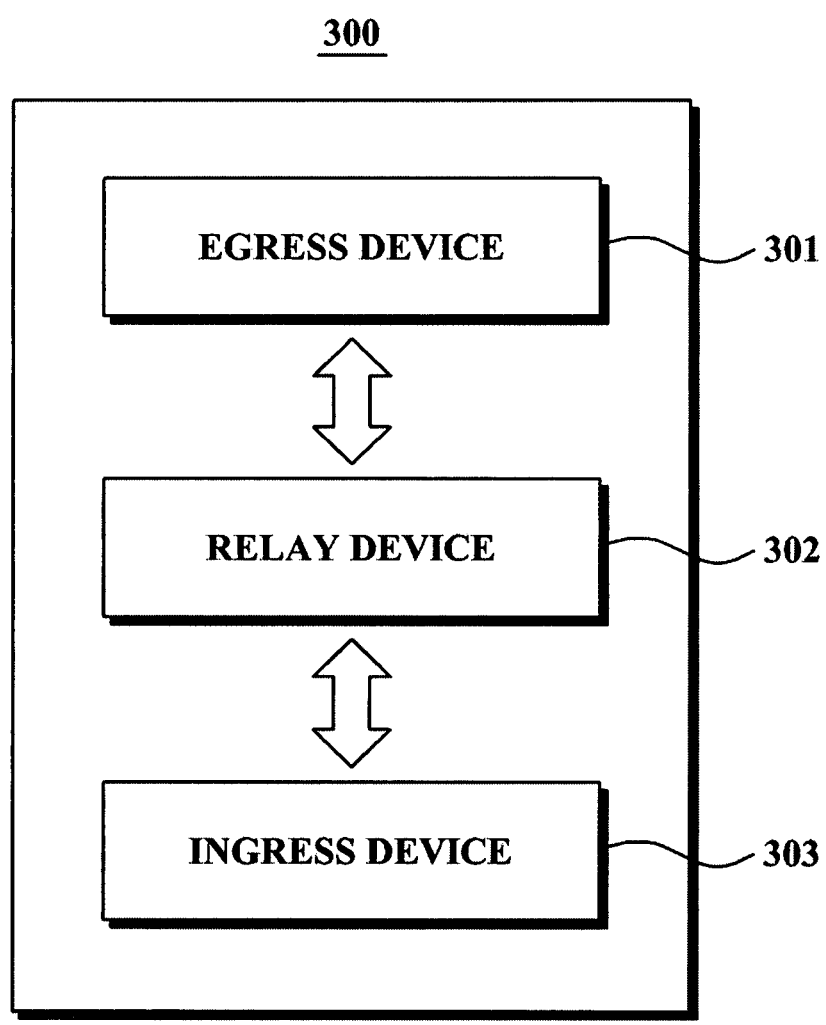
FIG. 3 is a block diagram illustrating an internal configuration of an AVB system using an extended AVB reservation protocol according to an exemplary embodiment of the present invention.

FIG. 3 is a block diagram illustrating an internal configuration of an AVB system 300 using an extended AVB reservation protocol according to an exemplary embodiment of the present invention. As shown in FIG. 3, the AVB system 300 may include an egress device 301, a relay device 302, and an ingress device 303.

The egress device 301 transmits a GARP/MRP message including an application stream identifier or an AVB stream identifier to the relay device 302. The GARP/MRP message may be generated by including the AVB stream identifier or by including the application stream identifier when the egress device 301 excludes the AVB stream identifier.

As described above, when the egress device 301 is unaware of the AVB stream identifier, the egress device 301 may identify the application stream identifier from an upper layer application and include the application stream identifier in the GARP/MRP message and then transmit the GARP/MRP message.

Also, the GARP/MRP message may include attribute type information which indicates which identifier between the AVB stream identifier and the application stream identifier is utilized.

The relay device 302 registers the AVB stream identifier or the application stream identifier according to the GARP/MRP message and transmits the GARP/MRP message including the application stream identifier to the ingress device 303. In an exemplary implementation, the relay device 302 may extract the AVB stream identifier or the application stream identifier from the GARP/MRP message and register the extracted AVB stream identifier or the application stream identifier and transmit the GARP/MRP message to the ingress device.

Also, the application stream identifier corresponds to an upper layer application which triggers the AVB reservation protocol. When registering the application stream identifier, the relay device 302 may include an application type of the upper layer application in registration information about the application stream identifier. The application type may help a subsequent search for a match between the AVB stream identifier and the application stream identifier.

The ingress device 303 allocates the AVB stream identifier corresponding to the application stream identifier via the GARP/MRP message including the application stream identifier, and transmits a reservation signal to the relay device 302. In an exemplary implementation, the reservation signal may include the application stream identifier and the AVB stream identifier corresponding to the application stream identifier.

Also, the relay device 302 may map the AVB stream identifier and the application stream identifier based on the reservation signal received from the ingress device 303 and transmit the reservation signal to the egress device 301.

The egress device 301, which receives the reservation signal from the relay device 302, may map the AVB stream identifier and the application stream identifier based on the received reservation signal.

When the egress device 301 and the relay device 302 include the AVB stream identifier, the egress device 301 and the relay device 302 may perform the refresh process for registration of the corresponding stream by using only the AVB stream identifier. Therefore, the AVB system 300 may reduce a signaling overhead and also may utilize a stream setup latency lower than an "out-of-band query-and-answer" mechanism.

Figure 4:
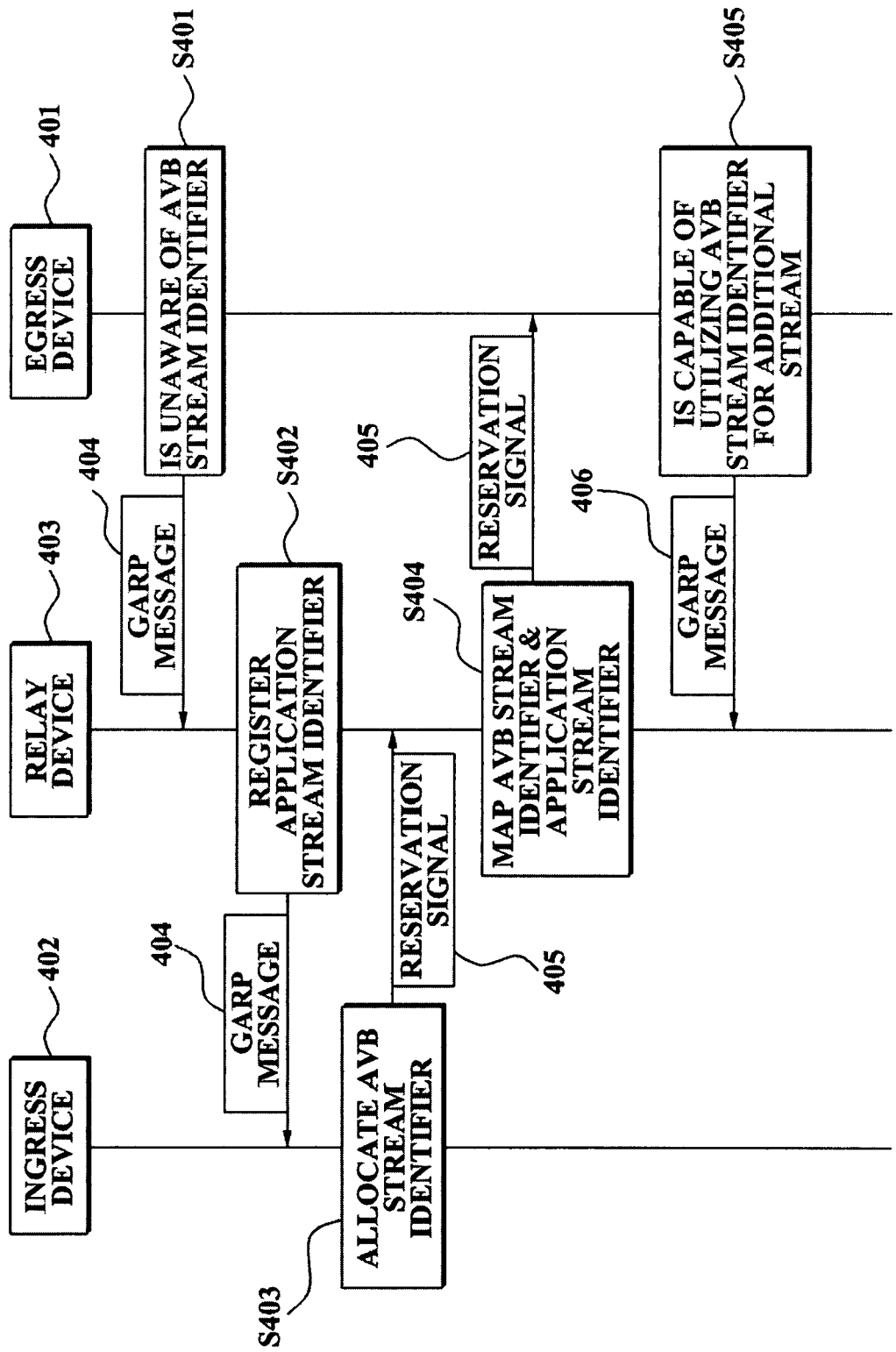
FIG. 4 illustrates an example of a message flow among an egress device, a relay device, and an ingress device according to an exemplary embodiment of the present invention.

FIG. 4 illustrates a message flow among an egress device 401, an ingress device 402 and a relay device 403 according to an exemplary embodiment of the present invention.

When the egress device 401 is unaware of an AVB stream identifier (S401), the egress device 401 acquires an application stream identifier from an upper layer application, generates a GARP/MRP message 404 including the application stream identifier (for example, 192.168.1.2:7000) and transmits the generated GARP/MRP message 404 to the ingress device 402.

In an exemplary implementation, the relay device 403 between the egress device 401 and the ingress 402 receives the GARP/MRP message 404, registers the application stream identifier included in the GARP/MRP message 404 (S402) and transmits the GARP/MRP message 404 to the ingress device 402.

The ingress device 402 allocates the AVB stream identifier corresponding to the application stream identifier of the GARP/MRP message 404 (S403), generates a reservation signal 405 including the application stream identifier and the AVB stream identifier, and transmits the generated reservation signal 405 to the relay device 403.

The relay device 403 receives the reservation signal 405, maps the registered application stream identifier with the AVB stream identifier included in the reservation signal 405 (S404) and transmits the reservation signal 405 to the egress device 401.

When the egress device 401 receives the reservation signal 405, the process for registration and reservation of the resource is completed. Therefore, the egress device 401 may be capable of utilizing the AVB stream identifier included in the reservation signal 405 (S405). Also, as described above with FIG. 1, the egress device 401 may perform a process for registration and reservation of a resource of the AVB stream identifier via another GARP/MRP message 406 including the AVB stream identifier.

Figure 5:
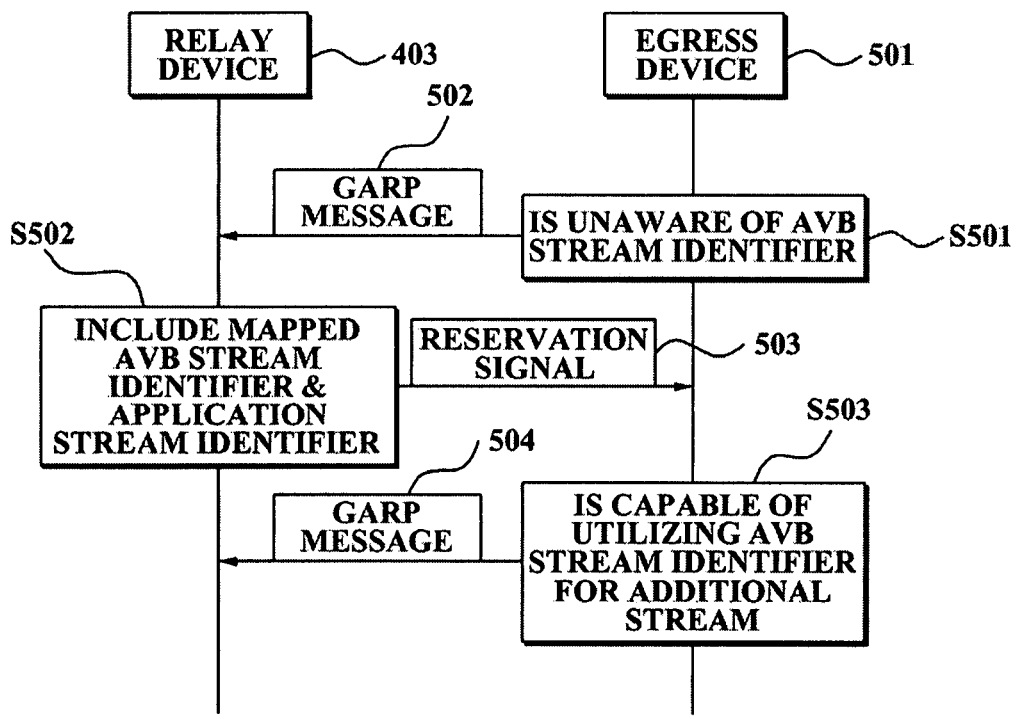
FIG. 5 illustrates an example of a message flow in a registration and reservation of a resource via a relay device including a mapped AVB stream identifier and an application stream identifier according to an exemplary embodiment of the present invention.

FIG. 5 illustrates an example of a message flow in a registration and reservation of a resource via a relay device including a mapped AVB stream identifier and an application stream identifier according to an exemplary embodiment of the present invention.

As described above with FIG. 4, when an egress device 501 is unaware of an AVB stream identifier (S501), the egress device 501 acquires an application stream identifier from an upper layer application, generates a GARP/MRP message 502 including the application stream identifier, and transmits the generated GARP/MRP message 502 to an ingress device.

In an exemplary implementation, as described above with FIG. 4, when the relay device 403 including a mapped AVB stream identifier and an application stream identifier exists between the egress device 501 and the ingress device, the relay device 403 may generate a reservation signal 503 including the AVB stream identifier and the application stream identifier (S502) and transmit the generated reservation signal 503 to the egress device 501.

Therefore, the egress device 501 may be capable of utilizing the AVB stream identifier (S503), make the refresh process for of the corresponding stream using GARP/MRP message 504 including only the AVB stream identifier. Also, a signaling overhead and a stream setup latency may be reduced.

For example, even when an egress device is unaware of an AVB stream identifier, the egress device may perform a process for registration and reservation of a resource by using an application stream identifier of an upper layer application. Also, even when the egress device is unaware of the AVB stream identifier, the process for registration and reservation of the resource may be performed with a single go-and-return operation.

Also, a signaling overhead and stream setup latency may be reduced via an AVB reservation protocol using a standard service interface without an additional requirement or extension with respect to the upper layer application. Therefore, a system performance may be enhanced.

Figure 6:
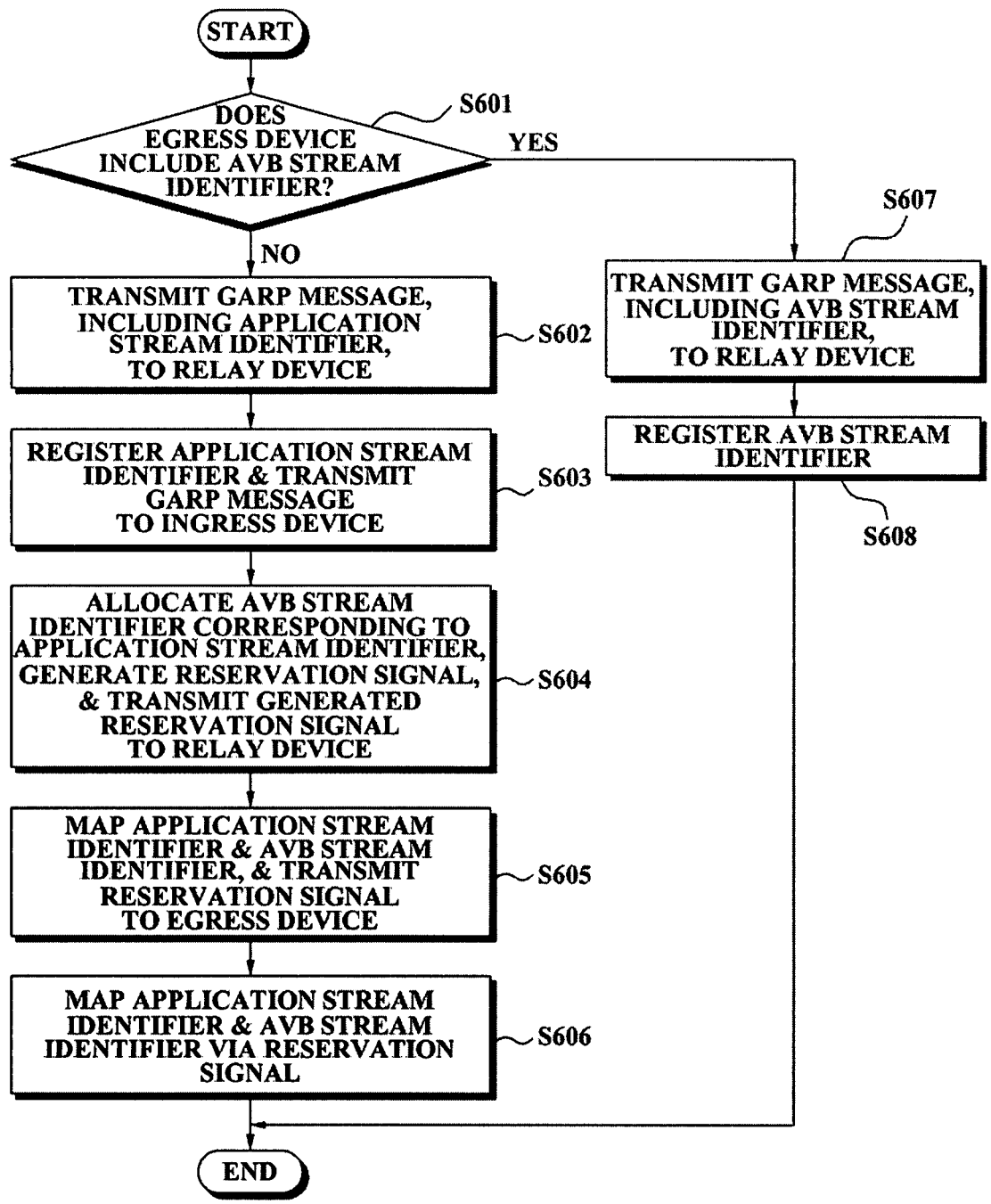
FIG. 6 is a flowchart illustrating a resource reservation method using an extended AVB reservation protocol according to an exemplary embodiment of the present invention.

FIG. 6 is a flowchart illustrating a resource reservation method using an extended AVB reservation protocol according to an exemplary embodiment of the present invention.

In step S601, whether an egress device includes an AVB stream identifier is determined. When the egress device excludes the AVB stream identifier, step S602 is performed. Conversely, when the egress device includes the AVB stream identifier, step S607 is performed.

In step S602, the egress device transmits a GARP/MRP message including an application stream identifier to a relay device. In an exemplary implementation, in step S602, the egress device may identify the application stream identifier from an upper layer application which triggers the AVB reservation protocol, generate the GARP/MRP message including the application stream identifier and transmit the generated GARP/MRP message to the relay device.

In step S603, the relay device registers the application stream identifier included in the GARP/MRP message and transmits the GARP/MRP message to an ingress message. In an exemplary implementation, the application stream identifier may correspond to the upper layer application which triggers the AVB reservation protocol. When registering the application stream identifier, the relay device may include an application type with respect to the upper layer application in registration information of the application stream identifier.

In step S604, the ingress device allocates the AVB stream identifier corresponding to the application stream identifier, generates a reservation signal and transmits the generated reservation signal to the relay device. For example, the egress device which starts an admission control process is triggered by the upper layer application and the AVB stream identifier may be allocated. Also, the reservation signal may include the application stream identifier and the AVB stream identifier corresponding to the application stream identifier.

In step S605, the relay device maps the application stream identifier and the AVB stream identifier by using the reservation signal, and transmits the reservation signal to the egress device.

In step S606, the egress device maps the AVB stream identifier and the application stream identifier based on the reservation signal received from the relay device. The egress device completes the process for registration and reservation of a resource via steps S601 through S606, and then becomes capable of utilizing the AVB stream identifier for a registration and reservation of a subsequent stream.

Also, when the relay device and the egress device, which map the AVB stream identifier and the application stream identifier, include the AVB stream identifier to reduce signaling overhead and stream setup latency, the relay device and the egress device perform a process for registration and reservation of a resource by using only the AVB stream identifier.

In step S607, when the egress device includes the AVB stream identifier, the egress device transmits the GARP/MRP message including the AVB stream identifier to the relay device.

In step S608, when the transmitted GARP/MRP message includes the AVB stream identifier, the relay device registers the AVB stream identifier.

Operations after step S608 will be the similar to the operations as described with FIG. 1 and thus further detailed descriptions related thereto will be omitted.

As described above, even when an egress device is unaware of an AVB stream identifier, a process for registration and reservation of a resource may be performed by using an application stream identifier of an upper layer application. Also, even when the egress device is unaware of the AVB stream identifier, the process for registration and reservation of the resource may be performed with a single go-and-return operation.

Also, a signal overhead and delay may be reduced via an AVB reservation protocol using a standard service interface without an additional requirement or extension with respect to the upper layer application. Therefore, a system performance may be enhanced.

Exemplary embodiments of the present invention may include computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to exemplary embodiments of the present invention, it is possible to perform a process for registration and reservation of a resource by using an application stream identifier of an upper layer application even when an egress device is unaware of an AVB stream identifier.

Also, according to exemplary embodiments of the present invention, it is possible to perform the process for registration and reservation of the resource with a single go-and-return operation even when the egress device is unaware of the AVB stream identifier.

Also, according to exemplary embodiments of the present invention, it is possible to reduce a signaling overhead and stream setup latency via an AVB reservation protocol by using a standard service interface without an additional requirement or extension with respect to the upper layer application, and thereby can enhance a system performance.

While the invention has shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. An audio/video bridging (AVB) system using an extended AVB reservation protocol, the AVB system comprising:
   an egress device configured to transmit at least one of a Generic Attribute Registration Protocol (GARP) message and a Multiple Registration Protocol (MRP) message, comprising an application stream identifier, to a relay device in response to the egress device being unaware of an AVB stream identifier corresponding to the application stream identifier;
   the relay device the application stream identifier according to the at least one of the GARP message and the MRP message, and to transmit to the at least one of the GARP message and the MRP message to an ingress device; and
   the ingress device configured to allocate the AVB stream identifier corresponding to the application stream identifier via the at least one of the GARP message and the MRP message comprising the application stream identifier, and transmitting to transmit a reservation signal including the AVB stream identifier to the relay device, wherein the relay device transmits the AVB stream identifier to the egress device.

2. The AVB system of claim 1, wherein the relay device extracts the application stream identifier from the at least one of the GARP message and the MRP message and registers the extracted.

3. The AVB system of claim 1, wherein the reservation signal comprises the application stream identifier and the AVB stream identifier corresponding to the application stream identifier.

4. The AVB system of claim 3, wherein the at least one of the GARP message and the MRP message comprises attribute type information which indicates that the application stream identifier is included in the message.

5. The AVB system of claim 1, wherein the relay device maps the AVB stream identifier and the application stream identifier based on the reservation signal received from the ingress device or upstream relay devices, and transmits the reservation signal to the egress device or downstream relay devices.

6. The AVB system of claim 1, wherein the egress device maps the AVB stream identifier and the application stream identifier based on the reservation signal received from the relay device.

7. The AVB system of claim 1, wherein the application stream identifier corresponds to an upper layer application which triggers the AVB reservation protocol, and
   the relay device registers the application stream identifier, the registration information about the application stream identifier comprising an application type of the upper layer application.

8. The AVB system of claim 1, wherein the relay device and the egress device perform a process for registration and reservation of a resource by using the AVB stream identifier when the relay device and the egress device comprise the AVB stream identifier.

9. A method of reserving a resource using an extended AVB reservation protocol, the method comprising:
   transmitting, by an egress device, a Generic Attribute Registration Protocol (GARP) message or a Multiple Registration Protocol (MRP) message comprising an application stream identifier to a relay device, in response to the egress device being unaware of an AVB stream identifier corresponding to the application stream identifier;
   registering, by the relay device, the application stream identifier, and transmitting the GARP message or the MRP message to an ingress device;
   allocating, by the ingress device, the AVB stream identifier corresponding to the application stream identifier;
   generating a reservation signal and transmitting the generated reservation signal to the relay device; and
   mapping, by the relay device, the application stream identifier and the AVB stream identifier using the reservation signal, and transmitting the reservation signal to the egress device or at least one downstream relay device.

10. The method of claim 9, wherein the transmitting of the GARP message or the MRP message to the relay device comprises:
    identifying the application stream identifier from an upper layer application which triggers the AVB reservation protocol; and
    generating the GARP message or the MRP message comprising the application stream identifier and transmitting the generated GARP message or the MRP message to the relay device.

11. The method of claim 9, further comprising: transmitting, by the egress device, the GARP message or the MRP message comprising the AVB stream identifier to the relay device when the egress device comprises the AVB stream identifier; and
    registering, by the relay device, the AVB stream identifier when the GARP message or the MRP message comprises the AVB stream identifier.

12. The method of claim 9, wherein the reservation signal comprises the application stream identifier and the AVB stream identifier corresponding to the application stream identifier.

13. The method of claim 9, further comprising:
    mapping, by the egress device, the AVB stream identifier and the application stream identifier based on the reservation signal received from the relay device.

14. The method of claim 9, wherein the application stream identifier corresponds to an upper layer application which triggers the AVB reservation protocol, and
    the transmitting of the GARP message or the MRP message to the egress device comprises:
    registering the application stream identifier, the registration information about the application stream identifier comprising an application type of the upper layer application.

15. The method of claim 9, further comprising: performing, by the relay device and the egress device, a process for registration and reservation of a resource by using the AVB stream identifier when the relay device and the egress device comprise the AVB stream identifier.

16. A non-transitory computer-readable recording medium storing a program for implementing a method of reserving a resource using an extended AVB reservation protocol, the method comprising:
    transmitting, by an egress device, a Generic Attribute Registration Protocol (GARP) message or a Multiple Registration Protocol (MRP) message comprising an application stream identifier to a relay device, in response to the egress device being unaware of an AVB stream identifier;

registering, by the relay device, the application stream identifier, and transmitting the GARP/MRP message to an ingress device;

allocating, by the ingress device, the AVB stream identifier corresponding to the application stream identifier;

generating a reservation signal and transmitting the generated reservation signal to the relay device; and mapping, by the relay device, the application stream identifier and the AVB stream identifier using the reservation signal, and transmitting the reservation signal to the egress device or at least one downstream relay device.

\* \* \* \* \*